Nov. 26, 1968     R. B. JOHNSTON     3,412,646
RECIPROCATING PISTON TYPE MOTOR SYSTEMS
Filed June 28, 1965     5 Sheets-Sheet 4
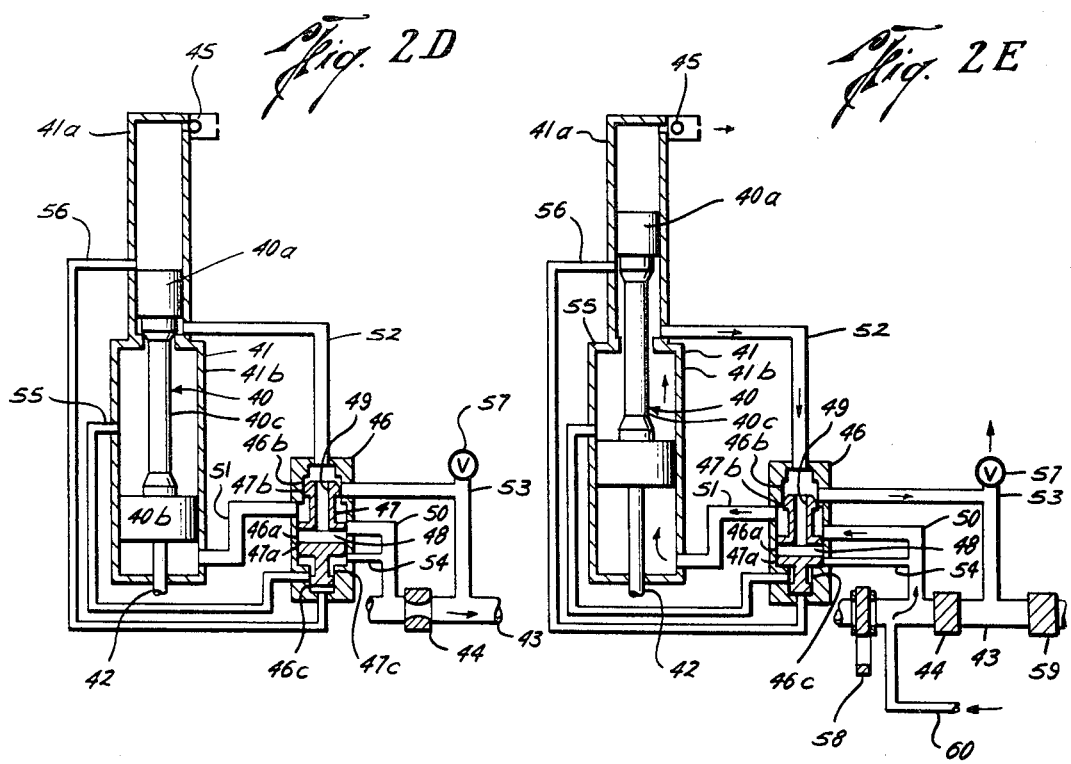
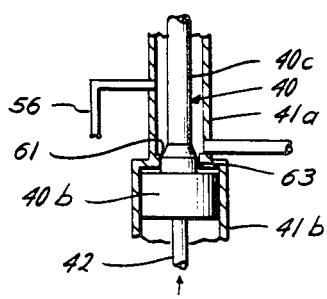
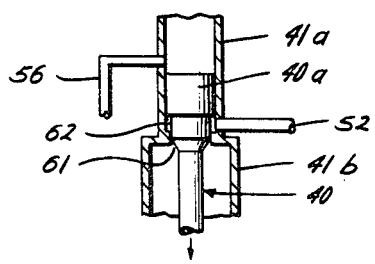
Rufus B. Johnston
INVENTOR.
BY
ATTORNEYS Nov. 26, 1968    R. B. JOHNSTON    3,412,646
RECIPROCATING PISTON TYPE MOTOR SYSTEMS
Filed June 28, 1965    5 Sheets-Sheet 5
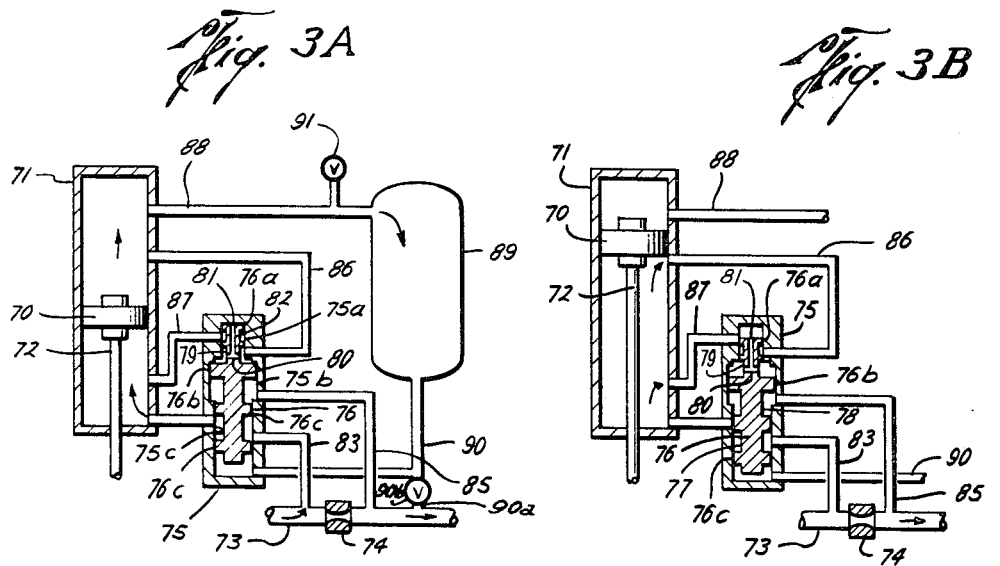
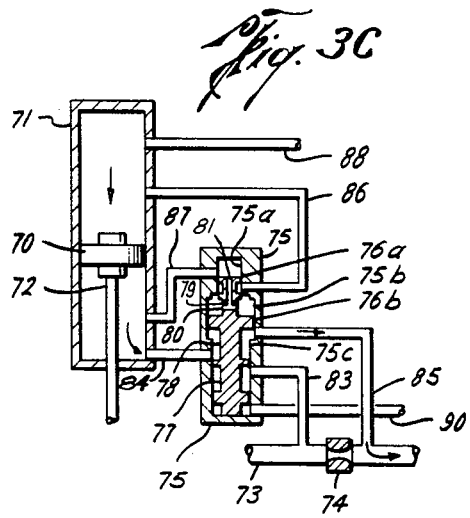
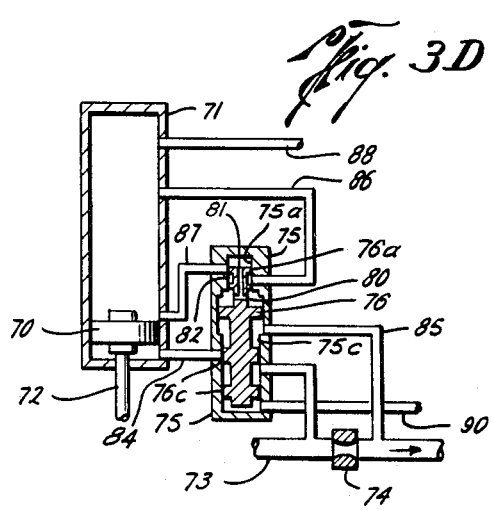
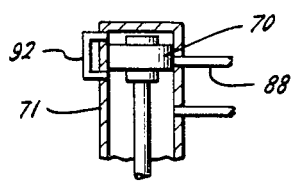
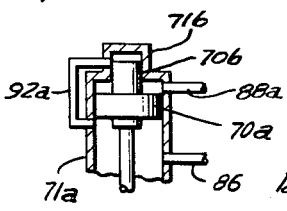
Rufus B. Johnston
INVENTOR.
BY
ATTORNEYS United States Patent Office 3,412,646
Patented Nov. 26, 1968

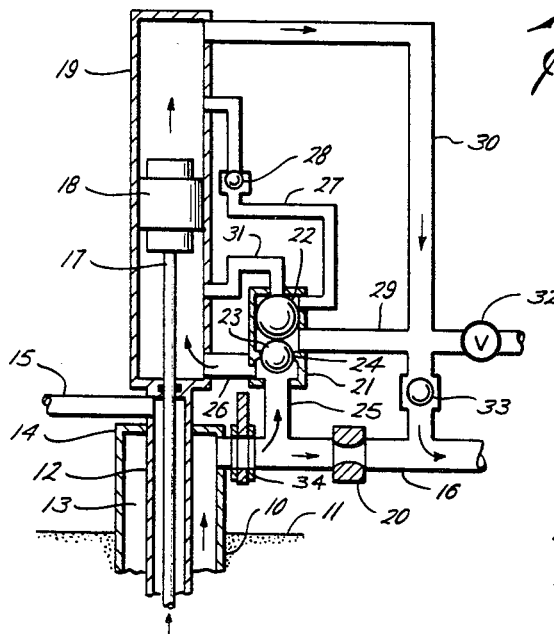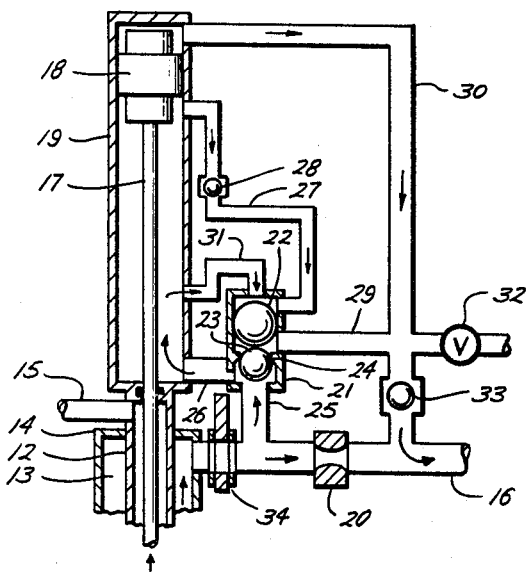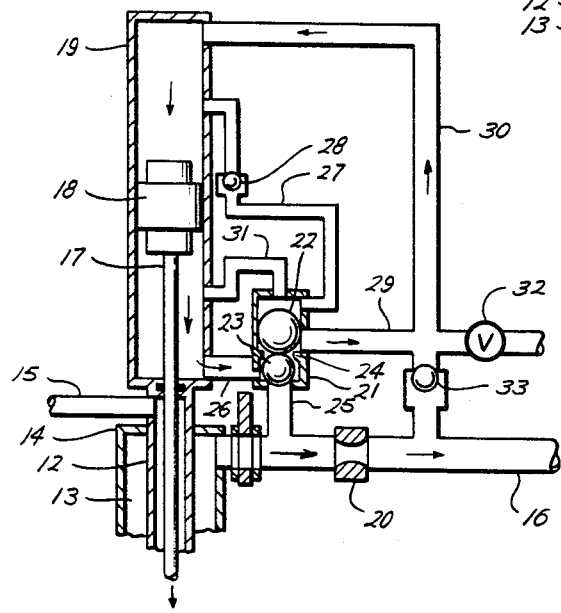

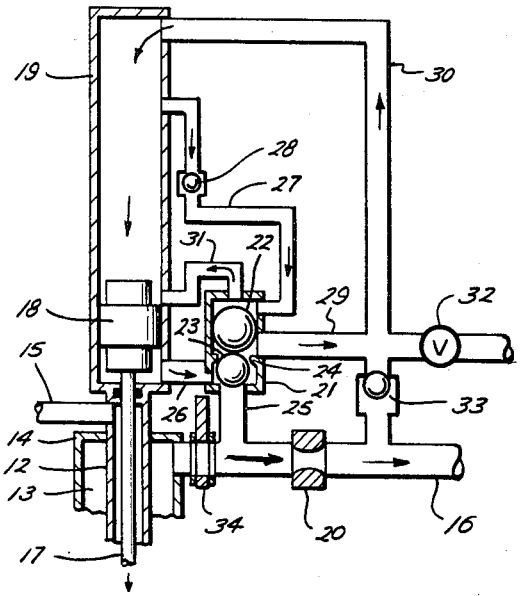
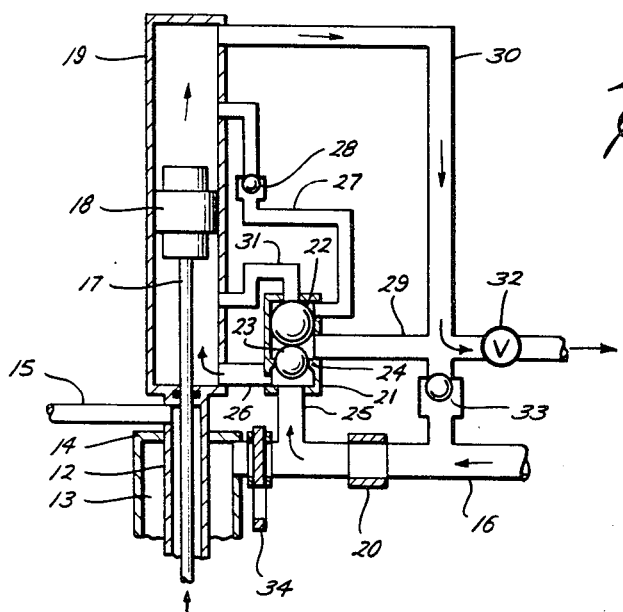

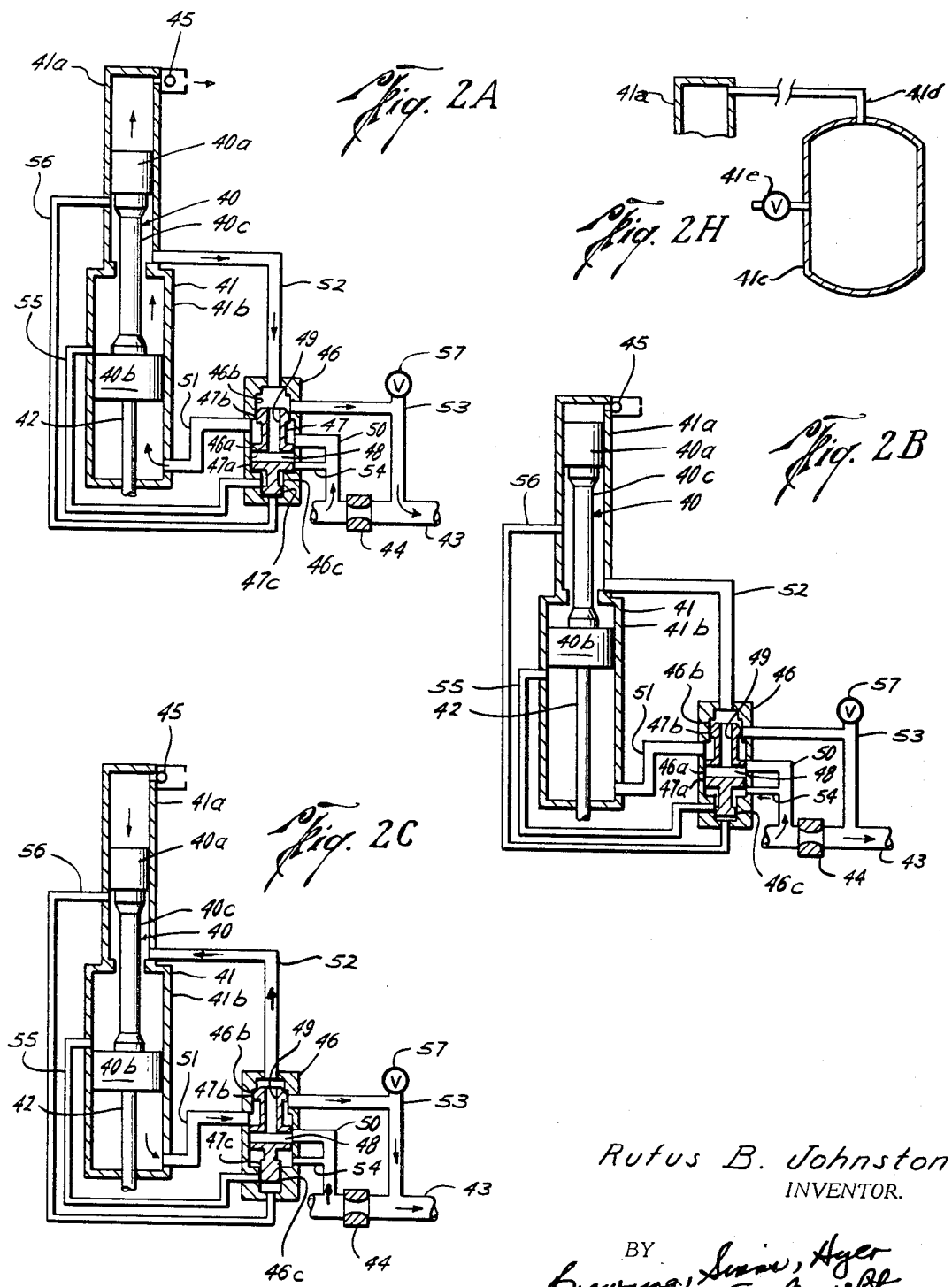

3,412,646
RECIPROCATING PISTON TYPE
MOTOR SYSTEMS
Rufus B. Johnston, 5837 E. University,
Dallas, Tex. 75206
Filed June 28, 1965, Ser. No. 467,262
7 Claims. (Cl. 91—165)

ABSTRACT OF THE DISCLOSURE

In a motor system operating a reciprocating down-hole pump to lift the fluid within the tubing of a well from which gas is produced at the wallhead for delivery to a gathering station through a flowline having an adjustable choke, a cylinder mounted above the wellhead and having piston means reciprocal within it and a rod extending from the piston means through the cylinder and connected to the sucker rod of the pump. An input conduit connects the flowline upstream of the choke with a reversing valve, and an exhaust conduit connects the reversing valve with the flowline downstream of the choke. There is a means for shifting the valve between alternate positions in which the input conduit is connected with the cylinder on the lower side of the piston means to raise it within the cylinder, and in which the cylinder on the lower side of the piston means is connected with the exhaust conduit, when the piston means has been raised, so that the piston means may be moved downwardly to its lower position.

---

This invention relates generally to reciprocating piston type motor systems. In one of its aspects, this invention relates to an improved system of this type for operating a "downhole" well pump by means of a source of pressure fluid at or near the head of the well, such as, for example, gas which is produced from the well. In another of its aspects, it relates to improvements in systems of this type wherein the fluid for operating same is to be exhausted to a source which is at greater than atmospheric pressure. In still another of its aspects, it relates to improvements in gas operated motor systems of this type.

Encroaching water has been lifted from the tubing of gas producing wells by means of a downhole pump having sucker rods extending to a reciprocating piston type motor at the wellhead. However, these motors have been actuated by a compressor or other prime mover, and the gas produced from the annulus about the tubing has been admitted from the wellhead to the flowline for delivery to a gathering station. This gas is purchased at a predetermined pressure in the sales line on the downstream side of an adjustable choke in the flowline near the wellhead. In many cases, the differential gas pressure across the choke is relatively small.

The prime movers for operating these motors not only represent a substantial initial investment, but, more importantly, are expensive to maintain and operate. Therefore, it has been proposed to operate such motors by means of the produced gas at the wellhead. However, in prior systems of this type, the produced gas has been exhausted to the atmosphere. This, of course represents a substantial loss which is undesirable in the case of gas wells of this type and may be intolerable in other environments. Also, when the source fluid is volatile, as is natural gas, its exhaust to atmosphere may constitute a safety hazard.

It is therefore an object of this invention to provide a motor system of this type for operating a downhole well pump which does not require a compressor or other prime mover; and, more particularly, which is operated by gas produced from the well without the loss of more than a negligible amount of same.

Another object is to provide a reciprocating piston type motor system for operating a downhole well pump by means of a source of fluid at or near the head of the well to which such fluid is returned at a pressure above atmospheric.

A more particular object is to provide a reciprocating piston motor system for lifting the sucker rod of a downhole well pump or the like wherein the fluid for operating the system may be exhausted to a source at a pressure greater than atmospheric with only a relatively small pressure drop between the input to the system and such exhaust.

Yet a further object is to provide a gas operated motor system of this type in which there is little or no wastage of such gas during the entire cycle of operation.

These and other objects are accomplished, in accordance with the present invention, by a system which, for purposes of illustration, is used in the operation of a well of the character above described. In such a system, produced gas from the flowline on the high pressure or upstream side of the choke is admitted through a reversing valve to the motor piston means, during its working stroke, and returned from the piston means and through the reversing valve to the flowline on the low pressure or downstream side of the choke, during the return stroke of the piston. More particularly, this is accomplished in each of the embodiments of the invention by means of only the pressure differential across the choke and with only a negligible loss of source gas, thereby eliminating the need for a prime mover and avoiding the large loss of revenues.

In the preferred forms of the system, it includes a means for counterbalancing the weight of the sucker rod so as to reduce the differential pressure required to operate it to a minimum. Thus, there is another gas source contained in the cylinder above the piston means in its upper position at a pressure less than that at which the produced gas is returned to the flowline. Thus, in these preferred systems, it is possible to avoid a backpressure from the flowline on the top side of the piston. Instead, the pressure required for operating the piston is only that necessary to lift the weight of the liquid on the downhole pump.

This counterbalance pressure may be atmospheric or, preferably, higher than atmospheric. In the latter case, an accumulator is connected to the upper end of the cylinder, and a valve is provided for regulating the counterbalance pressure.

It will be understood that although the system of this invention is especially well suited for the use illustrated herein, it obviously has other applications. For example, it may be used in operating a pump to produce oil from a well by means of gas from the same or another well or from another zone within the same well. Also, it may be used in operating a pump to produce oil or lift water from a well by means of a fluid, whether liquid or gas, which is present at or near the wellhead at sufficient pressure to provide the necessary differential. Furthermore, such system may be operated by means of fluid from one source and exhausted to another source at a pressure greater than atmospheric.

Although the system is particularly well adapted to operation by gas, especially when the flowline between the input to and exhaust from the system is shut off, it is also adapted for use by liquid. In this sense, the term "fluid" is used to include liquid as well as gas.

In the drawings, wherein like reference characters are used throughout to designate like parts, FIGS. 1A, 1B, 1C, 1D and 1E are schematic views showing various operating positions of the parts of a motor system constructed in accordance with the present invention and mounted on the upper end of a gas well for operating a downhole pump in the well to lift water therefrom;

In this group of figures, FIG. 1A shows the piston of the motor system as it moves upwardly during its working stroke so as to lift the plunger of the downhold pump;

FIG. 1B shows the piston at the upper end of its travel;

FIG. 1C shows the piston as it moves downwardly during its return stroke;

FIG. 1D shows the piston in its lowermost position; and

FIG. 1E shows parts of the system as it is started by another source of gas;

FIGS. 2A, 2B, 2C, 2D, 2E, 2F, 2G and 2H are schematic views showing various operating positions of the parts of another motor system constructed in accordance with the present invention:

In this group of figures, FIG. 2A shows the piston of the motor as it rises in the cylinder during its working stroke;

FIG. 2B shows the piston at the upper end of its travel within the cylinder;

FIG. 2C shows the piston as it moves downwardly within the cylinder;

FIG. 2D shows such piston at the lower end of its travel;

FIG. 2E shows the system as it is started by another source of gas;

FIGS. 2F and 2G show the lower and upper ends, respectively, of the piston in the positions which it would assume in the event of over-travel within the cylinder; and FIG. 2H shows a modified construction of the upper end of the cylinder;

FIGS. 3A, 3B, 3C and 3D are schematic views showing various operating positions of the parts of still another motor system constructed in accordance with the present invention;

In this group of figures, FIG. 3A shows the piston of the motor as it rises during its working stroke;

FIG. 3B shows the motor piston at the upper end of its travel within the cylinder;

FIG. 3C shows such piston as it moves downwardly during its return stroke;

FIG. 3D shows such piston at its lowermost level; and

FIGS. 3E and 3F show modified forms of the upper end of the motor cylinder and piston.

With reference now to the details of the above described drawings, and particularly the embodiment of the invention shown in FIGS. 1A to 1E, the casing 10 of a gas well is shown in FIG. 1A to extend downwardly below ground level 11, and a tubing 12 extends concentrically within the casing 10 to form an annulus 13 thereabout. As well known in the art, the annulus is perforated at a level adjacent a gas producing zone to permit the gas to flow upwardly through the annulus 13. The upper end of the annulus is closed by a suitable head 14 from which the tubing may be suspended in any well known manner. In this illustrative environment of the invention, water is to be lifted through the tubing 12 and out a flowline 15 for delivery to a suitable point of disposal, and the gas within annulus 13 is to be delivered to a suitable gathering station through a flowline 16.

A downhole pump (not shown) for so lifting the water has a sucker rod connected at its upper end to a rod 17 depending from a piston 18 reciprocable within a cylinder 19 of the motor. Thus, as can be seen from FIG. 1A, the cylinder is mounted coaxially above the upper end of the tubing 12 so that the piston rod 17 is in turn coaxial with the sucker rod of the downhole pump for extension downwardly to the sucker rod through a sealed opening in the lower end of the cylinder 19.

There is an adjustable choke or throttle valve 20 in the flowline 16, which may be adjusted between a closed and the fully open position of FIG. 1E, although it is normally in the partially open position of FIGS. 1A to 1D to deliver the produced gas to the sales line. In the latter position of the valve, there is a pressure differential between the gas on its upstream and downstream sides. As previously indicated, such a valve is found at or near many such wellheads for the purpose of regulating the pressure of the gas as it is delivered to the sales line.

The motor also includes a reversing valve comprising a hollow body 21 having a valve member comprising a pair of balls 22 and 23 shiftable therein. With the reversing valve body disposed in an upright position, as shown in the drawings, the balls comprising the valve member shift in a vertical direction parallel to the reciprocating piston 18, although it is obvious that the reversing valve body may assume any other position. At any rate, the upper ball 22 is closely slidable within the upper bore of the valve body 21, while the lower ball 23 fits closely within a restriction 24 in the valve body above the lower bore. A conduit 25 connects the high pressure side of the flowline 16 with the lower bore of the valve body 21 beneath the restriction 24, and a conduit 26 connects the lower valve body bore beneath such restriction with the lower end of the motor cylinder 19. Thus, with the valve member in the upper position of FIG. 1A, lower ball 23 is raised above the seat formed by the intersection of conduit 25 with the lower end of the valve body, and the high pressure gas passes through the valve body into the lower end of the cylinder beneath the piston 18.

A conduit 27 connects the upper bore of the valve body 21 with an upper portion of the cylinder 19 and has a ball check valve 28 disposed therein for preventing flow upwardly through the line while permitting such flow downwardly therethrough. Another conduit 29 connects with the upper bore at a level intermediate the conduits 26 and 27 and above the restriction 24. The other end of the conduit 29 connects with a conduit 30 which in turn connects with the upper end of the cylinder 19 with the low pressure side of the flowline 16.

In this system, the piston 18 is of such area that difference between the high and low pressures on opposite sides thereof provides the force necessary to lift the weight of the sucker rod plus the water to be lifted. Thus, the piston 18 will move upwardly as high pressure gas is admitted to the lower side of the piston 18 and low pressure source gas within the cylinder above the piston is exhausted through the conduit 30 into the low pressure side of the flowline. Any such low pressure gas flowing downwardly through the conduit 27 will act over the upper side of the ball 22, which has some clearance between it and the enlarged bore of the body 21 so as to permit a certain amount of leakage into the exhaust conduit 29. Thus, if there is any leakage past the seat for the ball 22, it will not cause a premature build-up of pressure which would overcome the force due to the higher pressure on the lower side of the smaller ball 23. Since, the ball 23 fits closely within the restriction 24 in the upper position of the valve member, it prevents the loss of high pressure source gas into the exhaust conduit 29.

When the piston 18 moves to the position of FIG. 1B, high pressure source gas flowing into the conduit 27 will open the check valve 28 therein and flow onto the annular area of the ball 22 about its seat. In this way, the valve member is shifted downwardly since the gas pressure acting on the larger area above the valve member is now equal to that acting on the area below it. This downward shifting of the valve member is assisted by the admission of high pressure source gas to the upper end of the valve body 21 through conduit 31 connecting with the cylinder 19 intermediate conduits 26 and 27. That is, even though there may be tendency for the upper ball 22 to stop as the piston 18 begins to move downwardly from the position of FIG. 1B, and over conduit 27, conduit 31 will continue to supply the high pressure gas to the upper end of the valve body and thus to the upper end of the valve member.

Downward shifting of the valve member will cause the smaller ball 23 to close the seat at the intersection of the upper end of conduit 25 with the valve body so as to shut off further supply of high pressure gas to the lower end of the reversing valve body bore. In this manner, all such high pressure gas is diverted directly through the choke 20 into the low pressure side of the flowline 16. Also, since the smaller ball moves downwardly from the restriction 24, it defines an annular clearance between it and the valve body bore to permit the high pressure gas trapped beneath the piston 18 to escape through the side conduit 29 into the conduit 30. The gas escaping from the lower end of the piston 18 is nevertheless higher than the low pressure side of the flowline so that the ball check 28 is moved upwardly to closed position. Also, this gas pressure is effective over the larger ball 22 in holding the valve member in the downward position shown in FIG. 1C.

The piston 18 continues to move downwardly until its upper end passes the intersection of conduit 31 with the cylinder 19, as shown in FIG. 1D. At this time, the gas above the larger ball 22 is released into cylinder 19 through the conduit 31, so that the high pressure gas in the flowline upstream of choke 30 is effective to move the smaller ball off its seat and raise the two balls comprising the valve member upwardly. As the valve member moves upwardly, the smaller ball 23 moves into the bore restriction 24 so as to divert the high pressure gas through the conduit 26 into the lower end of the cylinder. When the flow of high pressure gas to the lower side of the piston becomes greater than the exhaust of pressure above the piston, the piston is urged upwardly to the position shown in FIG. 1A.

When the piston 18 moves upwardly over the intersection of conduit 31 with the cylinder, high pressure gas is admitted to the upper side of the larger ball 22 and the seat formed by the intersection of conduit 31 with the valve body 21. However, the area within the seat is much smaller than that within the restricted bore 24. Therefore, the reversing valve is maintained in its upper position during continued upward travel of the piston 18.

It will be understood that pressure of the gas on the downstream side of choke 20 does not vary appreciably during operation of the motor. Thus, the flowline 16 acts as a large accumulator, and each half of the cycle, in any case, lasts only a few seconds.

A vent valve 32 and a ball check valve 33, both located in the conduit 30, are useful in starting the system when the source gas within the flowline is of insufficient pressure, as indicated diagrammatically by shut off 34 in FIG. 1E. The vent valve is opened to a desired extent and gas is borrowed from a suitable source and introduced into the flowline 16. This moves check valve 33 upwardly to close the conduit 30 intermediate the vent valve 32 and the intersection of conduit 30 with the downstream side of the flowline. Thus, with this borrowed gas at a required pressure, the system is caused to function in the same manner as illustrated in FIGS. 1A–1D. When the water in the tubing has been lowered sufficiently to restore source gas pressure, the vent valve is closed and the shut off 34 opened to establish normal operation of the system.

In this starting operation, the choke 20 may be fully open, as indicated in FIG. 1E, or partially closed as long as there is a sufficient flow of borrowed gas from the right to the left through the choke and into conduit 25. Obviously, during the starting operation as well as the normal operation of the system, the opening through choke 20 may be adjusted to regulate the pumping speed without affecting the differential in the gas. In fact, since the operating fluid is gas, the choke may be closed down completely and the gas permitted to accumulate in the flowline upstream of the choke during the return stroke of the piston. More particularly, this is possible without the necessity of relieving the pressure of the source gas or by passing it to the downstream side of the choke, as might be required with an hydraulic system.

In the embodiment of the invention illustrated in FIGS. 2A to 2G, a piston 40 is reciprocable within a cylinder 41, and, similarly to piston 18 of the previously described embodiment of the invention, has a rod 42 extending downwardly therefrom through the lower end of the cylinder for connection to the sucker rod of a downhole pump. Thus, the motor system of FIGS. 2A to 2G may be mounted above a wellhead in the manner illustrated in FIG. 1A. It will further be understood that gas from the annulus of the well may be produced through the flowline 43 having a choke 44 therein so as to deliver such gas to the purchaser at a predetermined pressure.

As distinguished from the piston 18 of the first-described embodiment, a piston 40 includes an upper piston element 40a and a lower piston element 40b connected by a rod 40c. The upper piston element 40a is the smaller of the two and is sealably slidable within upper reduced cylinder element 41a, while the larger piston element 40b is sealably slidable within enlarged cylinder element 41b. The upper end of cylinder element 41a is vented to atmosphere by means of an outwardly opening check valve 45.

As will be described to follow, lower piston element 40b is double-acting—i.e., urged upwardly and downwardly by high pressure source gas. This makes it possible, of course, to reduce the diameter of the cylinder and thus the volume of gas required to operate the motor. The upper piston element 40a serves the purpose in this construction of preventing the venting of source gas to atmosphere. As will also be understood from the description to follow, atmospheric pressure contained in cylinder element 41a above piston element 40a eliminates the back pressure due to source gas, which would be present in the system of FIGS. 1A to 1E, and thereby lessens the downward force on the piston so as to effectively counterbalance the weight of the sucker rod of the pump.

The reversing valve for this motor system includes a hollow body 46 having a spool type valve member 47 reciprocal therein. The valve body has an enlarged bore 46a in an intermediate portion thereof, a smaller bore 46b above the bore 46a and a still smaller bore 46c beneath the bore 46a. Piston area 47b on the upper end of the valve member 47 slides within bore 46b, piston area 47a on an intermediate portion of the valve member slides within bore 46a, and piston area 47c on the lower end of the valve member slides within the lower bore 46c of the valve body. A port 48 extends laterally from one side to the other of the piston area 47a and is connected at an intermediate portion to a port 49 connecting with the upper side of the valve member 47 above piston area 47b. For reasons which will be apparent from the description to follow, the outer circumference of the valve member 47 is reduced intermediate the piston areas 47b and 47a as well as between piston areas 47a and 47c.

An input conduit 50 connects the high pressure side of the flowline 43 with the lower end of the enlarged bore 46a of the valve body. A conduit 51 connects an upper level of the intermediate bore 46a of the valve body with the lower end of the cylinder 41. A third conduit 52 connects the lower end of cylinder element 41a with the upper end of the valve body 46, and thus with the upper end of the bore 46b, while a fourth conduit 53 connects a side of the valve member within upper bore 46b with the low pressure side of the flowline 43.

Thus, with the valve member 47 shifted to its lower position, as shown in FIG. 2A of the drawings, high pressure gas from the flowline passes through the conduit 50 into the reversing valve, about a reduced diameter portion of the valve member, and from the reversing valve through the conduit 51 into the lower end of the cylinder beneath the lower piston element 40b.

At the same time, gas between the upper and lower piston elements 40a and 40b passes from the cylinder through the conduit 52 into the upper end of the reversing valve body 46, and from the body through conduit 53 into the low pressure side of the flowline downstream of choke 44. Thus, as the piston is moving upwardly within the cylinder during the working stroke of the downhole pump, high pressure gas is active on the lower side of piston element 40b, low pressure gas is active on the upper side of piston element 40b and the lower side of piston element 40a, and the upper side of piston 40a is exposed to atmospheric pressure.

The piston element 40a is of such size that the low pressure gas acting over its lower side provides a force which counterbalances the weight of the sucker rod as well as approximately one-half the weight of the well fluid being lifted by the plunger of the downhole pump. The lower piston element 40b is of such area that the differential pressure acting across it is of sufficient force to lift the remaining one-half of the weight of the well fluid.

It will be understood from FIG. 2A that as the piston 40 moves upwardly within cylinder 41 during its working stroke, the reversing valve is held in its lower position by virtue of the high pressure gas acting on the upper side of intermediate piston area 46a of the reversing valve member. Although there may be some leakage of high pressure gas to the bottom of piston area 47a through a booster conduit 54 connecting conduit 50 with the intermediate bore 46a of the reversing valve body, such leakage will be relatively small and will, in any case, vent to the low pressure gas above the piston element 40b through conduit 55 connecting the reversing valve body with an intermediate portion of cylinder element 41b. Thus, as shown in FIG. 2A, conduit 55 connects with the valve body above piston area 47c adjacent the reduced bore 46c of the reversing valve member, while the opposite end of this conduit connects with the cylinder element 41b above piston element 40b during a major portion of the upward stroke of the motor piston. As the piston element 40b moves upwardly from the position shown in FIG. 2A, it will of course shut off further venting through the conduit 55.

As the piston 40 continues its upward working stroke, it will move above the intersection of conduit 55 with cylinder element 41b, so that the high pressure gas is vented through such conduit into the reversing valve body intermediate piston areas 47a and 47c. Since the differential area on the lower side of piston area 47a is larger than that on the upper side thereof, this venting of high pressure gas will start the reversing valve member on its upward stroke. After such reversing valve member has moved a very short distance, further high pressure gas is admitted to the lower side of piston area 47a through booster conduit 54, as will be apparent from FIG. 2B. At this intermediate stage of upward movement of the reversing valve member, its lower piston area 47c is moved across the intersection of actuating conduit 55 with the bore of the valve body so as to prevent the loss of high pressure gas acting over the lower side of piston area 47a. Thus, the valve member will continue in its upward stroke.

When the reversing valve member has completed its upward stroke, as shown in FIG. 2C, high pressure gas is admitted from the flowline through conduit 50 and passages 48 and 49 in the reversing valve member into the conduit 52, so that it acts now upon the upper side of the piston element 40b. At the same time, gas beneath the piston element 40b passes through the conduit 51 into the bore 46a of the valve body above piston area 47a and from the valve body into the low pressure side of the flowline by means of the conduit 53. As can be seen from FIG. 2C, the reduced diameter portion of the reversing valve member intermediate piston areas 47a and 47b provides communication between the conduits 51 and 53.

As previously mentioned, the upwardly directed counterbalancing force is equal to the rod weight plus approximately one-half the weight of the liquid. Since only the weight of the rod is available in urging the piston downwardly in its return stroke, the differential pressure acting across the lower piston element 40b must provide a force equal to one-half the weight of the liquid. In this manner, the rod weight is available to cause the piston to move downwardly.

A conduit 56 connects upper cylinder element 41a with the lower end of the reversing valve body beneath piston area 47c. Thus, during this stage of the operation of the motor system, the reversing valve member is held in its upper position by virtue of high pressure gas acting over the lower side of differential piston area 47a as well as over the lower side of piston area 47c, at least when the piston element 40b passes below the intersection of actuating conduit 55 with the cylinder element 41b.

During this downward stroke of the piston 40, there is a tendency to pull a vacuum in the upper cylinder element 41a inasmuch as the vent check valve 45 is closed. However, this is a relatively small force, at least compared with the working pressures involved, and the vacuum will in fact be helpful upon the subsequent upward stroke of the piston 40. Thus, the main purpose of the check valve 45 is to eliminate dirt and moisture from the upper end of cylinder element 41a.

When the upper piston element 40a passes beneath the intersection of conduit 56 with cylinder element 41a, as shown in FIG. 2D, high pressure gas on the lower side of piston area 47c will be exhausted to atmosphere through the check valve 45. This unbalances the forces across the reversing valve member so that the high pressure gas acting over the upper side of piston area 47b plus the low pressure gas acting over the upper end of piston area 47a causes the reversing valve member to move downwardly, as indicated in FIG. 2D. Additional downward force is provided when piston area 47c falls below the intersection of conduit 55 with the valve body bore, whereby the high pressure gas of the lower side of piston area 47a is vented through conduit 55 to the low pressure gas. Also, as the reversing valve member continues to move downwardly, the piston area 47a thereon will close the booster conduit 54 thereby completely cutting off the supply of high pressure gas to the lower side of piston area 47a. Thus, at this stage, the reversing valve member snaps quickly to its lowermost position, after which the working cycle of the motor system may begin again.

There is a vent valve 57 in the conduit 53 which is useful in starting the motor system when the wellhead gas pressure is insufficient and closed in, as indicated diagrammatically at 58. Thus, as indicated diagrammatically at 59 in FIG. 2E, the low pressure side of the flowline 43 may also be shut in, the choke 44 closed, and the vent valve 57 opened. At this time, borrowed gas may be introduced through conduit 60 connecting with the flowline intermediate shut-in 58 and choke 44. This will put the motor system back in operation, as previously described, until such time as the water is pumped off sufficiently to restore wellhead gas pressure. When this point is reached, the shut-ins 58 and 59 may be removed, the vent valve 57 closed, and the choke 44 adjusted to divert the desired flow of source gas into the system.

In the event of a fairly substantial change in well conditions, it may be desirable to apply a back pressure to the upper end of cylinder element 41a, together with a means for regulating same to maintain a balanced operation of the piston. For this purpose, an accumulator 41c is connected by a conduit 41d to a port in the upper end of the cylinder 41 and provided with a valve 41e for charging and regulating the pressure of same.

FIGS. 2F and 2G illustrate the construction of the piston 40 and cylinder 41 which is useful in absorbing shocks due to over-travel of the piston in both its working and return strokes. Thus, the bore of the cylinder is reduced at 61 intermediate the upper cylinder element 41a and lower cylinder element 41b. The rod 40c connecting the upper and lower piston elements 40a and 40b is enlarged at its upper end 62 as well as its lower end 63, in each case to a diameter approximating the restriction 61 in the cylinder 14.

Thus, with reference to FIG. 2F, in the event the lower piston element 40b over-travels during its upward stroke, the enlarged portion 63 of the rod 40c moves into the restriction 61 in the cylinder to trap gas between the upper side of the lower piston element and the upper end of cylinder element 41b. The compression of this gas will serve as a means for decelerating and thus cushioning the upward movement of the piston. On the other hand, in the event the piston over-travels in the downward direction, enlarged portion 62 of the upper end of rod 40c will enter the restriction 61, as shown in FIG. 2G. In this case, the gas beneath upper piston element 40a is not trapped since it is free to flow into the conduit 52. However, the gas above lower piston element 40b is expanded so as to reduce the pressure above the lower piston element 40a and thereby tend to decelerate its downward movement.

In the motor system illustrated in FIGS. 3A to 3D, a piston 70 reciprocal within a cylinder 71 has a rod 72 extending from its lower end and through a sealed opening in the bottom of the cylinder for connection to the part to be operated. In this case, as in the case of the previously described embodiments of this invention, it is contemplated that the cylinder will be mounted on the upper end of a wellhead to permit the rod 72 to be connected to the sucker rod of a downhole pump for lifting encroaching water in the well tubing. Also, and again as described in other embodiments of the invention, a flowline 73 may be connected at its left-hand end to the annulus of the well so as to receive gas produced from the well and at its right-hand end with a sales line for connection to a gathering system. Still further, there is a choke 74 in the flowline near the wellhead so as to control the pressure at which the gas is delivered to the sales line.

This motor system also includes a reversing valve comprising, as in the other embodiments, a hollow valve body 75 having a valve member 76 reciprocal therein. As can be seen from the drawings, the valve member 76 is of the spool type, as in the second described embodiment. It includes an upper piston area 76a sealably slidable in upper bore 75a of the valve body, an intermediate piston area 76b sealably slidable within intermediate bore 75b of the valve body, and spaced apart lower piston areas 76c sealably slidable within lower bore 75c of the valve body. The bore 75b is the larger of the three bores, while the upper bore 75a is the smallest of the bores. The area 76b is approximately twice that of each of the areas 76c.

Valve member 76 has a reduced diameter portion 77 intermediate the two piston areas 76c, another reduced diameter portion 78 intermediate the piston area 76b and the upper piston area 76c, and a further reduced diameter portion 79 intermediate the piston area 76b and 76a. A port 80 extends through the reduced portion 79 and is connected with another port 81 connecting it to the upper side of the piston area 76a. There is a further reduced diameter portion 82 within the piston area 76a.

A conduit 83 connects the high pressure side of the flowline 73 with an intermediate portion of the valve body at the bore 75c, and a conduit 84 connects an upper level of the bore 75c of the valve body with the lower end of the cylinder 71. The enlarged bore 75b of the valve body is connected with the low pressure side of the flowline— i.e., on the downstream side of choke 74—by means of a conduit 85. A third conduit 86 connects an intermediate portion of the cylinder 71 with the smallest bore 75a of the valve body, while a fourth conduit 87 connects this small bore 75a of the valve body at a level above the connection therewith conduit 86 with the cylinder 71 intermediate the conduits 84 and 86.

A conduit 88 connects the upper end of the cylinder 71 with an accumulator 89, and the accumulator is in turn connected with the bore 75c on the lower end of the valve body by means of a conduit 90. There is an adjustable relief valve 91 in the portion of the system including the conduits 88 and 90 and the accumulator 89. As shown in the drawings, this valve is located in the conduit 88 near the intersection of such conduit with the accumulator.

In the operation of this system, the accumulator 89 is initially charged with gas from the wellhead. For this purpose, there is a conduit 90a connecting the flowline 73 with conduit 90, as shown in FIG. 3A. A valve 90b connected in the conduit 90a may be opened to permit source gas to flow through this passage and conduit 90 into the accumulator. Alternatively, and during normal operation of the system, this valve may be closed. As will be understood from the description to follow, the gas in the accumulator and its connections with the system will be permitted by valve 91 to assume a pressure lower than the low pressure side of the gas in flowline 73.

More particularly, accumulator pressure is regulated so that the differential between it and the low pressure side of the gas source creates a force on the piston approximately equal to the weight of the sucker rod of the downhole pump. Thus, upon the upstroke of the piston 70 during the working stroke of the motor system, the high pressure gas acting on the lower side of the piston 70 must be in excess of the low pressure gas by an amount necessary to produce a force for lifting the weight of the liquid. Therefore, upon the return stroke of the piston, as shown in FIG. 3C, the cylinder beneath the piston 70 is exhausting to the lower pressure side so that the weight of the sucker rod will pull the piston down.

With reference now particularly to FIG. 3A, it will be seen that with the reversing valve member in its upper position, high pressure gas is admitted through the conduit 83 into the valve body and, by virtue of the reduced diameter portion 77 of the valve member, to the conduit 84 for admittance to the lower side of piston 70 within the cylinder 71. During this time, accumulator pressure is acting on the upper side of the piston 70 through its connection with the upper end of the cylinder by means of the conduit 88. Accumulator pressure also acts over the upper end of piston area 76a as well as over the upper end of piston area 76b. This is made possible by means of the conduit 86 connecting with the cylinder and the bore 75a of the valve body, as well as by virtue of the ports 80 and 81 in the valve member. At the same time, the higher pressure of the low pressure side of the gas source acts on the lower side of piston area 76b and the upper side of the top piston area 76c, while accumulator pressure is acting on the lower side of the lower piston area 76c through the conduit 90. Thus, there is a resultant upward force on the reversing valve member due to the lower pressure source gas acting on the annular area defined between piston areas 76b and 76c.

Although there is some exhausting of accumulator pressure, which was derived from the gas source, during this upstroke of the piston 70, such loss is very small, as in the order of $\frac{1}{10}$ of 1% of the total gas produced. That is, once the accumulator has been charged, and the system is in operation, the only additional source gas finding its way into the accumulator and its connecting conduits is that due to leakage past the piston 70, plus the exhaust from the reversing valve during each cycle of operation of the motor system, as will be described to follow.

As will be understood from FIG. 3A, with the reversing valve member in its upper position, the piston area 75a closes off the connection with the valve body bore of the conduit 87. This prevents the loss of high pressure gas to the lower side of the piston 70 during its upstroke. It will also be noted that since the piston areas 76c are equal, the high pressure gas is not functional at this stage in holding the reversing valve in its upper position. However, the low pressure gas acts over the differential area between piston areas 76b and 76c so as to hold the reversing valve in its upward position. That is, as previously described, this low pressure source gas is higher than that within the accumulator, which is active through conduits 86 and 90 on the upper side of piston area 76c and the lower side of lower piston area 76c.

As the piston 70 moves upwardly past the connection of conduit 86 with the cylinder 71, as shown in FIG. 3B, the high pressure source gas beneath the piston flows through the conduit 86 onto the upper side of reversing valve piston area 76b. It also flows through the ports 80 and 81 onto the upper side of piston area 76a. The force due to this high pressure gas is therefore effective to move the reversing valve in a downward direction since it is opposed only by equal areas exposed to low pressure gas and accumulator pressure. In the intermediate position shown in FIG. 3B, the top piston area 76c has blocked off the connection of conduit 84 with the valve body, whereby the upward movement of the piston 70 has been stopped. The reduced diameter portion 82 at the upper end of the valve member is in an intermediate position which permits the high pressure gas to equalize throughout the upper end of the valve member.

Upon further downward movement of the spool type valve member, the top piston area 76c will move below the connection of conduit 84 with the valve body, so as to permit gas beneath piston 70 to pass through the annular area 77 into the conduit 85 connecting with the low pressure side of the gas source. In this way, the piston 70 is permitted to move downwardly under the weight of the sucker rods, and drive the low pressure gas beneath it into the low pressure side of the flowline 73.

It will also be noted that while this downward movement of the valve member to the position of FIG. 3C closes off the intersection of conduit 86 with the valve body, it opens the intersection with the valve body of conduit 87, so as to permit gas to also escape through this conduit and the valve body into the conduit 85. Thus, as the piston 70 drops below the intersection of conduit 86 with the cylinder 71, source gas will be admitted to the area 76a on the upper end of the valve member through the conduit 87, even though the pressure of the gas within the conduit 86 drops down to counterbalance pressure. Thus, the valve member is caused to continue to move downwardly until it reaches its lowermost position shown in FIG. 3C. The valve member is held in this lowermost position by the pressure differential between the low low pressure gas source and the accumulator pressure. That is, as in the case of the upward position of the valve member, the high pressure gas source is ineffective to shift the valve in either direction since it is active over equal areas 76c of the valve member.

When the piston 70 continues to move downwardly to its lowermost position, it uncovers the intersection of conduit 87 with the cylinder 71, as shown in FIG. 3D. This allows the low pressure source gas to exhaust into the cylinder above the piston 70 through conduits 87 and 86. Thus, the gas pressure above the piston area 76a and 76b becomes substantially that of the accumulator. As previously described, the relief valve will remove a sufficient amount of the exhausting gas to prevent it from adding to the counterbalance pressure to such an extent as to unbalance the system. The exhaust of low pressure gas source from the areas 76a and 76b of the valve member will again cause the valve member to begin its upward stroke inasmuch as the lower side of the piston area 76b is acted upon by the higher low pressure gas source.

In the event of over-travel of the piston in an upward direction, as might occur upon a break in the sucker rod string, shock would be absorbed by gas trapped above piston 70 as the piston moves over the intersection of conduit 88 with the upper end of the cylinder 71. In the modification shown in FIG. 3E, there is a small conduit 92 connecting with the cylinder 71 at levels above and below the piston in its over-travel position, so as to equalize pressure across the piston in order to accelerate its downward movement. In the modification of FIG. 3F, the cylinder 71a has a counter-bored upper end 71b to closely receive an upward extension 70b of the piston 70a upon over-travel of the latter. Here, the conduit 88a leading to the accumulator may be raised above the position shown in FIGS. 3A to 3E since gas is trapped above the extension 70b to cushion shock. The counter-bore portion 71b is connected with the main cylinder 71a by a small conduit 92a, which thus functions similarly to the conduit 92.

From the foregoing, it will be seen that this invention is one well adapted to attain all of the ends and objects hereinabove set forth, together with other advantages which are obvious and which are inherent to the apparatus.

The invention having been described, what is claimed is:

1. In a motor system operating a reciprocating downhole pump to lift fluid within the tubing of a well, wherein the wellhead has a flowline connecting therewith for delivering gas which is produced at the wellhead to a gathering station, and an adjustable choke is disposed within the flowline a cylinder mounted above the wellhead and having piston means reciprocable therein with a rod extending therefrom through the cylinder and connected to the sucker rod of the pump, a reversing valve, an input conduit connecting the flowline upstream of the choke with the valve, an exhaust conduit connecting the flowline downstream of the choke with the valve, and means for shifting said valve between alternate positions in which the input conduit is connected with the cylinder on the lower side of the piston means to raise it within said cylinder and in which the cylinder on the lower side of the piston means is connected with the exhaust conduit, when the piston means has been raised, so that said piston means may drop to its lower position.

2. A motor system of the character defined in claim 1, including means for venting the exhaust conduit, and means for closing the flowline upstream of the choke so that gas from another source may be introduced into said input conduit, upon isolation of said input conduit from the gathering station and venting means, so as to initiate reciprocation of the piston means independently of the produced gas source.

3. A motor system of the character defined in claim 1, including means for counterbalancing the weight of said sucker rod.

4. In a reciprocating piston type motor system, wherein there is a supply of gas within a line having a valve for controlling flow therethrough; a cylinder having piston means reciprocable therein and a rod extending from the piston means through an end of the cylinder, a reversing valve, a first conduit connecting the line upstream of the first mentioned valve with an input port in said reversing valve, a second conduit connecting an exhaust port in said reversing valve with the line downstream of the first mentioned valve, and means for shifting the reversing valve, during reciprocation of the piston means, between alternate positions in which the cylinder on the lower side of the piston means is connected with the input and exhaust ports, respectively, said reversing valve having means preventing communication between said input and exhaust ports in its alternate positions.

5. In a motor system for operating a reciprocating pump by means of fluid which is exhausted into a source which is at a pressure greater than atmospheric, comprising a cylinder having a reduced bore above an enlarged bore, a piston having a reduced area reciprocable in the reduced bore and an enlarged area connected to the reduced area for reciprocation in the enlarged bore, a rod extending from the enlarged area through the enlarged cylinder bore for connection to the pump, a reversing valve comprising a hollow body having valve member shiftable therein, an input conduit for admitting said fluid to the valve body, an exhaust conduit for delivering said fluid from said valve body to said source, first and second conduits operable in a first position of the valve member to connect the valve body to a lower portion of the enlarged cylinder bore for admitting said fluid to the lower side of the enlarged piston area and to connect the cylinder intermediate the reduced and enlarged piston areas with the valve body for returning fluid intermediate said areas to said exhaust conduit, respectively, so as to raise said piston from a lower to an upper position, conduit means operable as the piston is raised to the upper position to connect an upper portion of the enlarged cylinder bore with the valve body to admit said fluid from the lower side of the enlarged piston area to said valve body in order to urge said valve member to a second position in which it connects the input conduit with the second conduit and the exhaust conduit with the first conduit, whereby the piston is urged downwardly to its lower position, and means connecting with the reduced cylinder bore above the reduced piston area in its upper position and including a valve for maintaining a counterbalance pressure of predetermined magnitude on the upper end of the reduced piston area.

6. In a motor system for operating a reciprocating pump by means of fluid which is exhausted into a source which is at a pressure greater than atmospheric, comprising a cylinder having a piston reciprocable therein and a rod extending from the piston and through the cylinder for connection to the pump, a reversing valve comprising a hollow body having a valve member shiftable therein, an input conduit for admitting said fluid to the valve body, an exhaust conduit for delivering said fluid from said valve body to said source, a first conduit connecting the valve body to a lower portion of the cylinder for admitting said fluid from the input conduit to the lower side of the piston, in a first position of the valve member, so as to raise said piston from a lower to an upper position, a second conduit connecting an upper portion of the cylinder with the valve body to exhaust said fluid from the lower side of the piston to said valve member, as the piston is raised to the upper position, so as to urge said valve member to a second position in which it prevents communication between said input conduit and first conduit and permits said fluid from the lower side of the piston to flow into said exhaust conduit, an accumulator, a third conduit connecting the accumulator with the cylinder to provide a source of counterbalancing gas pressure above the piston, a fourth conduit connecting the source of counterbalancing gas pressure with an area of the valve member which is opposed to the area thereof over which fluid exhausted through said second conduit is effective, and a valve for relieving the pressure of said counterbalancing gas.

7. In a motor system for operating a reciprocating pump by means of fluid which is exhausted into a source which is at a pressure greater than atmospheric, comprising a cylinder having a reduced bore above an enlarged bore, a piston having a reduced area reciprocable in the reduced bore and an enlarged area connected to the reduced area and reciprocal in the enlarged bore, a rod extending from the enlarged area through the enlarged cylinder bore for connection to the pump, a reversing valve comprising a hollow body having a valve member shiftable therein, an inlet port for admitting said fluid to the valve body, an exhaust conduit for delivering said fluid from the valve body to said source, a first conduit connecting the valve body with a lower portion of the enlarged cylinder bore, a second conduit connecting the valve body with a lower portion of the reduced cylinder bore, means connecting with the reduced cylinder bore above the reduced piston area in its upper position and including a valve for maintaining a counterbalance pressure of predetermined magnitude on the upper end of the reduced piston area, and means including additional conduits connecting the valve body with the cylinder for shifting the valve member between alternate positions in which the input conduit is connected with the enlarged cylinder bore on the lower side of the enlarged piston to raise the piston within the cylinder and in which the enlarged cylinder bore on the lower side of the piston is connected with the exhaust conduit, when the piston has been so raised, so that the piston may move downwardly to its lower position.

References Cited

UNITED STATES PATENTS

| | | | |
|---|---|---|---|
| 2,048,550 | 7/1936 | Helenberg | 91—300 |
| 2,078,301 | 4/1937 | Wineman | 91—290 X |
| 2,605,612 | 8/1952 | Mason. | |
| 2,782,770 | 2/1957 | Vanalstyne | 91—290 X |
| 2,887,093 | 5/1959 | Jones | 91—300 X |
| 3,005,413 | 10/1961 | Coberly. | |
| 2,914,037 | 11/1959 | Johnston | 60—52 |
| 2,990,816 | 7/1961 | Vincent | 91—165 |
| 3,013,538 | 12/1961 | Welcher | 60—52 |
| 3,030,935 | 4/1962 | Hanes | 60—52 |
| 3,094,842 | 6/1953 | Johnston | 60—52 |
| 3,159,105 | 12/1964 | Chenault | 103—45 |
| 3,212,406 | 10/1965 | McDuffie | 60—52 |

MARTIN P. SCHWADRON, *Primary Examiner.*

I. C. COHEN, *Assistant Examiner.*